US012112558B2

(12) United States Patent
Ote et al.

(10) Patent No.: US 12,112,558 B2
(45) Date of Patent: Oct. 8, 2024

(54) LEARNING MODEL GENERATION METHOD, IDENTIFICATION METHOD, LEARNING MODEL GENERATION SYSTEM, IDENTIFICATION SYSTEM, AND NON-TRANSITORY COMPUTER-READABLE STORAGE MEDIUM

(71) Applicant: HAMAMATSU PHOTONICS K.K., Hamamatsu (JP)

(72) Inventors: Kibo Ote, Hamamatsu (JP); Fumio Hashimoto, Hamamatsu (JP); Osamu Yasuhiko, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 429 days.

(21) Appl. No.: 17/445,773

(22) Filed: Aug. 24, 2021

(65) Prior Publication Data
US 2022/0067332 A1    Mar. 3, 2022

(30) Foreign Application Priority Data
Aug. 28, 2020  (JP) ................................ 2020-144584

(51) Int. Cl.
*G06V 20/69* (2022.01)
*G06N 20/00* (2019.01)

(52) U.S. Cl.
CPC .......... *G06V 20/695* (2022.01); *G06N 20/00* (2019.01)

(58) Field of Classification Search
CPC .. G06V 10/774; G06V 20/695; G06V 20/698; G06V 10/82; G06V 10/764;
(Continued)

(56) References Cited

U.S. PATENT DOCUMENTS

| 11,514,289 B1* | 11/2022 | Otte ....................... G06N 20/00 |
| 2013/0107006 A1* | 5/2013 | Hong ...................... G06T 7/571 348/46 |

(Continued)

FOREIGN PATENT DOCUMENTS

| CN | 109597291 A | 4/2019 |
| CN | 111051955 A | 4/2020 |

(Continued)

OTHER PUBLICATIONS

Cheng Chau-Jern et al, "Digital hologram for data augmentation in learning-based pattern classification", Optics Letters, vol. 43, No. 21, Oct. 4, 2018, p. 5419-p. 5422, XP055882266.
(Continued)

*Primary Examiner* — Ian L Lemieux
*Assistant Examiner* — Sebastian-Sy Vuchi Ngo
(74) *Attorney, Agent, or Firm* — Faegre Drinker Biddle & Reath LLP

(57) ABSTRACT

The method includes an acquisition step for model generation of acquiring a hologram for model generation in which an image of a cell is captured and which is used to generate a learning model, a generation step for model generation of generating a new hologram for model generation having a different focal position from the acquired hologram for model generation and increasing the number of holograms for model generation, and a learning model generation step of generating a learning model by performing machine learning using the increased holograms for model generation.

20 Claims, 8 Drawing Sheets

(58) Field of Classification Search
CPC ........ G06V 40/172; G06N 20/00; G06T 5/60; G06T 2207/30024; G06T 7/344; G06T 7/571
See application file for complete search history.

(56) References Cited

U.S. PATENT DOCUMENTS

| | | | | |
|---|---|---|---|---|
| 2017/0169620 | A1* | 6/2017 | Bleiweiss | G06V 20/64 |
| 2019/0011882 | A1* | 1/2019 | Gusyatin | C12M 41/36 |
| 2019/0294108 | A1* | 9/2019 | Ozcan | G06V 10/82 |
| 2022/0319704 | A1* | 10/2022 | Feng | G06V 10/7753 |

FOREIGN PATENT DOCUMENTS

| | | |
|---|---|---|
| JP | 5981443 B2 | 8/2016 |
| JP | 2019-012270 A | 1/2019 |
| JP | 2019-148798 A | 9/2019 |
| WO | WO-2013/065796 A1 | 5/2013 |
| WO | WO-2016/017533 A1 | 2/2016 |
| WO | WO-2019/171546 A1 | 9/2019 |

OTHER PUBLICATIONS

Hillmann, Dierck et. al., "Aberration-free volumetric high-speed imaging of in vivo retina", Scientific Reports, 2016, 6:35209, p. 1-p. 11.

Iwai, Hidenao et. al., "Doppler-spectrally encoded imaging of translational objects," Optics Communications, 2014, 319, pp. 159-p. 169.

Lue, Niyom et. al., "Synthetic aperture tomographic phase microscopy for 3D imaging of live cells in translational motion," Optics Express, Sep. 29, 2008, vol. 16, No. 20, pp. 16240-16246.

Wu, Yichen et. al., "Extended depth-of-field in holographic imaging using deep-learning-based autofocusing and phase recovery," Optica, Jun. 2018, vol. 5, No. 6, pp. 704-710.

* cited by examiner

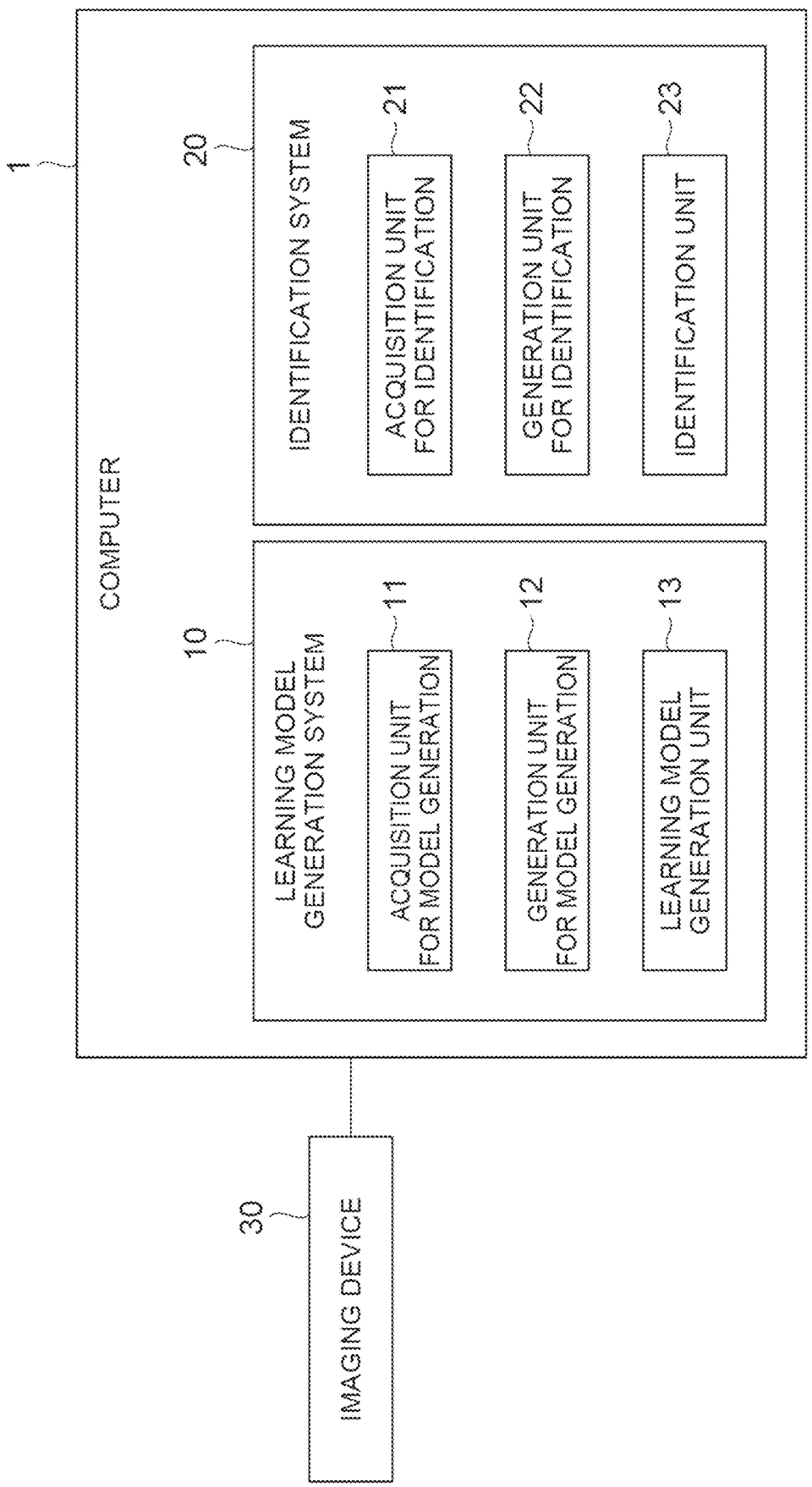

LEARNING MODEL GENERATION METHOD, IDENTIFICATION METHOD, LEARNING MODEL GENERATION SYSTEM, IDENTIFICATION SYSTEM, AND NON-TRANSITORY COMPUTER-READABLE STORAGE MEDIUM

TECHNICAL FIELD

The present invention relates to a learning model generation method, a learning model generation system, and a non-transitory computer-readable storage medium for generating a learning model for identifying a cell on the basis of a captured image of the cell, and relates to an identification method, an identification system, and a non-transitory computer-readable storage medium for identifying a cell on the basis of a captured image of the cell.

BACKGROUND

Cells released from primary tumor tissue or metastatic tumor tissue and infiltrated into blood are referred to as circulating tumor cells (CTC). Such CTCs are present in the peripheral blood of solid cancer patients in very small amounts and are considered to be involved in metastasis, and have been actively studied in recent years. On the other hand, since most nucleated cells in peripheral blood are leukocytes, it is important to distinguish between leukocytes and cancer cells. In CTC clinical applications, it has been reported that, in breast cancer patients, the death rate after a year is 19% if there are less than five CTCs in 7.5 mL of whole blood, and the death rate after a year is 53% if there are five or more CTCs. In this way, identifying and inspecting CTCs is considered to be of high clinical application value, such as being useful for predicting prognosis. There are some reports that leukocytes and cancer cells cannot be distinguished from each other by size in some types of cancer. Methods of identifying cells using information on cell morphology (image information reflecting not only the outer shape but also the internal structure) have been reported.

Information on cell morphology is acquired by, for example, capturing images of cells flowing with a liquid. However, during image capturing, it is not known in what direction cells usually flow. For this reason, three-dimensional information is required to correctly identify cells having a three-dimensional shape. Consequently, a method of capturing images of flowing cells three-dimensionally has been devised (see, for example, Japanese Unexamined Patent Publication No. 2019-148798 (Patent Literature 1), Japanese Patent No. 5981443 (Patent Literature 2), N. Lue, et al., Optics Express, 16, 20 (2008) (Non-Patent Literature 1) and H. Iwai, et al., Opt. Comm. 319, 159-169 (2014) (Non-Patent Literature 2)). In addition, as a method of identifying cells using information on cell morphology, a method using machine learning has been proposed (see, for example, International Publication No. WO2016/017533 (Patent Literature 3)).

SUMMARY

In a case where cells are identified through machine learning, for example, a case where a learning model for identification is generated, many cell images used in machine learning are required. Consequently, using the above three-dimensionally captured image as an image used for cell identification can be considered. However, in the above method of performing three-dimensional image capturing, there is a problem in that an optical system used for image capturing is complicated and it takes time to reconstruct an image. In addition, although a 2.5-dimensional image can be obtained using a change in focus, it is difficult for an imaging flow cytometer to continuously capture images of flowing cells while changing its focal position.

The present invention was contrived in view of the above point, and an object thereof is to provide a learning model generation method, an identification method, a learning model generation system, an identification system, a learning model generation program, an identification program, and a recording medium that make it possible to appropriately identify cells even in a case where many images cannot be prepared in advance.

In order to achieve the above object, according to an embodiment of the present invention, there is provided a learning model generation method of generating a learning model for identifying a cell on the basis of a captured image of the cell, the method including: an acquisition step for model generation of acquiring a hologram for model generation in which an image of a cell is captured and which is used to generate a learning model; a generation step for model generation of generating a new hologram for model generation having a different focal position from the hologram for model generation acquired in the acquisition step for model generation and increasing the number of holograms for model generation; and a learning model generation step of generating the learning model by performing machine learning using the holograms for model generation increased in the generation step for model generation.

In the learning model generation method according to an embodiment of the present invention, the number of holograms for model generation is increased to generate a learning model. Therefore, according to the learning model generation method of an embodiment of the present invention, it is possible to generate an appropriate learning model even in a case where many images cannot be prepared in advance, and to appropriately identify cells as a result.

The generation step for model generation may include increasing the number of holograms for model generation by adding or removing an aberration other than a change in a focal position to or from the hologram for model generation. According to such a configuration, it is possible to generate a more appropriate learning model, and to identify cells more appropriately as a result.

The learning model generation step may include generating the learning model by performing machine learning using a plurality of holograms for model generation increased in the generation step for model generation collectively as one input. According to such a configuration, it is possible to generate a more appropriate learning model, and to identify cells more appropriately as a result.

In addition, in order to achieve the above object, according to an embodiment of the present invention, there is provided an identification method of identifying a cell that is a target for identification on the basis of a captured image of the cell, the method including: an acquisition step for identification of acquiring a hologram for identification in which an image of the cell that is a target for identification is captured; a generation step for identification of generating a new hologram for identification having a different focal position from the hologram for identification acquired in the acquisition step for identification and increasing the number of holograms for identification; and an identification step of identifying the cell that is a target for identification on the basis of the holograms for identification increased in the generation step for identification.

In the identification method according to an embodiment of the present invention, a new hologram for identification is generated to identify a cell that is a target for identification. Therefore, according to the identification method of an embodiment of the present invention, it is possible to appropriately identify cells even in a case where many images cannot be prepared in advance.

The generation step for identification may include increasing the number of holograms for identification by adding or removing an aberration other than a change in a focal position to or from the hologram for identification. According to such a configuration, it is possible to identify cells more appropriately.

The identification step may include identifying the cell that is a target for identification using a learning model generated by the above learning model generation method. According to such a configuration, it is possible to identify cells more appropriately.

The identification step may include identifying the cell that is a target for identification for each increased hologram for identification and finally identifying the cell that is a target for identification on the basis of an identification result for each hologram for identification. According to such a configuration, it is possible to improve the accuracy of identification.

The identification step may include identifying the cell that is a target for identification using a plurality of holograms for identification increased in the generation step for identification collectively as one input. According to such a configuration, it is possible to identify cells more appropriately.

Incidentally, the present invention can be described as an invention of a learning model generation method as described above, and can also be described as an invention of a learning model generation system, a learning model generation program, and a recording medium as follows. In addition, the present invention can be described as an invention of an identification method as described above, and can also be described as an invention of an identification system, an identification program, and a recording medium as follows. These are substantially the same inventions differing only in category, and have the same operations and effects.

That is, according to an embodiment of the present invention, there is provided a learning model generation system configured to generate a learning model for identifying a cell on the basis of a captured image of the cell, the system including: acquisition means for model generation configured to acquire a hologram for model generation in which an image of a cell is captured and which is used to generate a learning model; generation means for model generation configured to generate a new hologram for model generation having a different focal position from the hologram for model generation acquired by the acquisition means for model generation and increase the number of holograms for model generation; and learning model generation means configured to generate the learning model by performing machine learning using the holograms for model generation increased by the generation means for model generation.

In addition, according to an embodiment of the present invention, there is provided an identification system configured to identify a cell that is a target for identification on the basis of a captured image of the cell, the system including: acquisition means for identification configured to acquire a hologram for identification in which an image of the cell that is a target for identification is captured; generation means for identification configured to generate new hologram for identification having a different focal position from the hologram for identification acquired by the acquisition means for identification and increase the number of holograms for identification; and identification means configured to identify the cell that is a target for identification on the basis of the holograms for identification increased by the generation means for identification.

In addition, according to an embodiment of the present invention, there is provided a learning model generation program causing a computer to operate as a learning model generation system configured to generate a learning model for identifying a cell on the basis of a captured image of the cell, the program causing the computer to function as: acquisition means for model generation configured to acquire a hologram for model generation in which an image of a cell is captured and which is used to generate a learning model; generation means for model generation configured to generate a new hologram for model generation having a different focal position from the hologram for model generation acquired by the acquisition means for model generation and increase the number of holograms for model generation; and learning model generation means configured to generate the learning model by performing machine learning using the holograms for model generation increased by the generation means for model generation.

In addition, according to an embodiment of the present invention, there is provided a computer readable recording medium in which the above learning model generation program is recorded.

In addition, according to an embodiment of the present invention, there is provided an identification program causing a computer to operate as identification system configured to identify a cell that is a target for identification on the basis of a captured image of the cell, the program causing the computer to function as: acquisition means for identification configured to acquire a hologram for identification in which an image of the cell that is a target for identification is captured; generation means for identification configured to generate a new hologram for identification having a different focal position from the hologram for identification acquired by the acquisition means for identification and increase the number of holograms for identification; and identification means configured to identify the cell that is a target for identification on the basis of the holograms for identification increased by the generation means for identification.

In addition, according to an embodiment of the present invention, there is provided a computer readable recording medium in which the above identification program is recorded.

According to an embodiment of the present invention, it is possible to appropriately identify cells even in a case where many images cannot be prepared in advance.

BRIEF DESCRIPTION OF THE DRAWINGS

FIG. 1 is a diagram illustrating a configuration of a learning model generation system and an identification system according to an embodiment of the present invention.

DETAILED DESCRIPTION

Figure 2A:
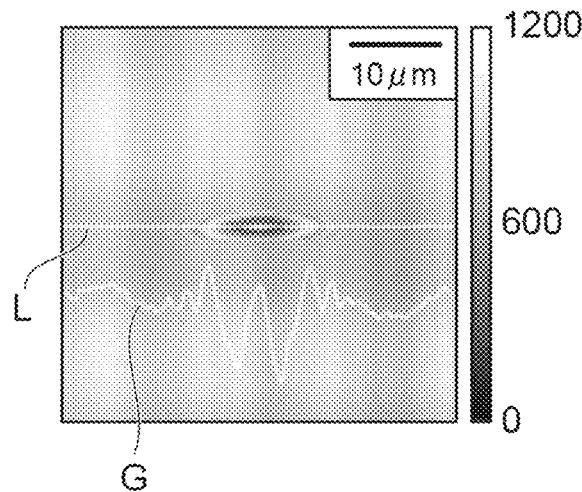
FIGS. 2A, 2B, 2C, and 2D are diagrams illustrating examples of holograms.

Hereinafter, embodiments of a learning model generation method, an identification method, a learning model generation system, an identification system, a learning model generation program, an identification program, and a recording medium according to the present invention will be described in detail together with the accompanying drawings. Meanwhile, in the description of the drawings, the same components are denoted by the same reference numerals and signs, and thus description thereof will not be repeated.

FIG. 1 shows a computer 1 which is a learning model generation system and an identification system according to the present embodiment. The computer 1 according to the present embodiment is a device (system) that performs information processing related to the identification of a cell based on a captured image of the cell. As a functional configuration, the computer 1 includes a learning model generation system 10 according to the present embodiment which generates a learning model for identifying (classifying) a cell on the basis of a captured image of the cell and an identification system 20 according to the present embodiment which identifies a cell that is a target for identification on the basis of a captured image of the cell.

For example, the computer 1 identifies (predicts) the type of cell. Specifically, the computer 1 uses cells of the blood of a test subject as an identification target to identify whether the cells in the blood are cancer cells (for example, the above-described CTCs) or non-cancer cells. As described above, the estimation of whether CTCs are contained in the blood has a high clinical application value. Alternatively, the computer 1 may identify which cancer type the cells in the blood correspond to, that is, the type of cancer cells. Meanwhile, the computer 1 may identify a type of cell other than those stated above, or may perform identification other than the type (for example, identification according to the degree of cell characteristics) insofar as identification is performed on cells. In addition, the identification is performed by a learning model generated by machine learning. That is, the identification is performed by artificial intelligence (AI).

An image used to identify cells in the computer 1 is a hologram (complex amplitude image). A hologram is an image in which the amplitude and phase of an electric field of light are recorded using object illumination light with which an object is illuminated and reference light which is obtained from the same light source. For example, in the case of a monochromatic hologram, data of the hologram has an amplitude value and a phase value for each pixel.

Figure 2B:
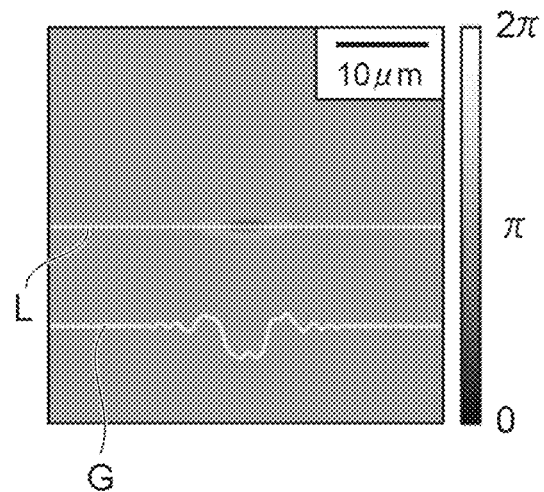
Figure 2C:
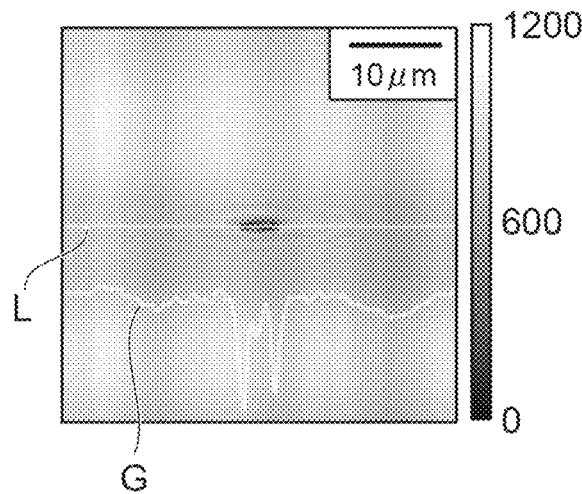
Figure 2D:
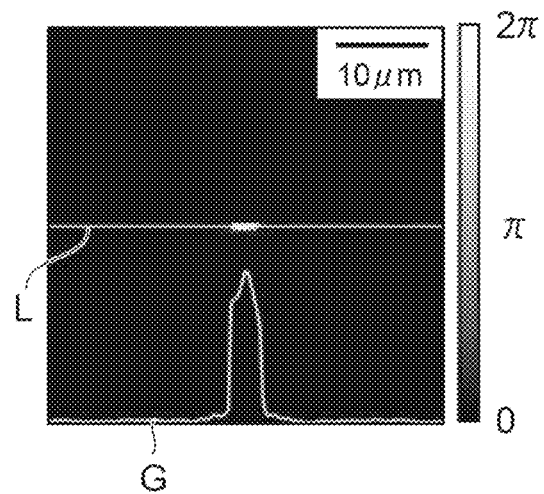

FIGS. 2A, 2B, 2C, and 2D show examples of data of holograms. FIGS. 2A and 2B are examples of out-of-focus holograms in which a target is out of focus. FIGS. 2C and 2D are examples of in-focus holograms in which a target is in focus. FIGS. 2A and 2C are amplitude images indicating an amplitude in each pixel. FIGS. 2B and 2D are phase images indicating a phase in each pixel. A value on a line L in each image is shown by a graph G Meanwhile, what is photographed in a hologram is polystyrene beads (having a diameter of 4.5 μm).

The computer 1 is, for example, a conventional computer including hardware such as a central processing unit (CPU), a memory, and a communication module. In addition, the computer 1 may be a computer system including a plurality of computers. In addition, the computer 1 may be constituted by cloud computing. Each function of the computer 1 to be described later is exhibited by these components operating through a program or the like.

An imaging device 30 is a device that captures an image of a cell to acquire a hologram used for identification in the computer 1. As the imaging device 30, any conventional imaging device that acquires a hologram through image capturing can be used. Specifically, as the imaging device 30, a conventional imaging flow cytometer (quantitative phase microscope) (for example, that shown in Patent Literature 2) can be used. Alternatively, a differential interference microscope may be used as the imaging device 30. Images obtained by these microscopes can visualize almost colorless and transparent cells with good contrast, and are widely used in the fields of biology and medicine. However, the imaging device 30 may be a device other than these microscopes insofar as it can capture an image of a hologram.

Examples of holograms which are captured by the imaging device 30 and used in the computer 1 include a hologram for model generation and a hologram for identification. The hologram for model generation is a hologram which is training data (learning data or teacher data) used in the generation of a learning model for identifying a cell (that is, used by the learning model generation system 10). The hologram for model generation is a hologram in which the type of cell photographed in the hologram is known, that is, a hologram of a known cell. The hologram for identification is a hologram in which a cell that is a target for identification is photographed (that is, used by the identification system 20). The hologram for identification is a hologram in which the type of cell photographed in the hologram is unknown, that is, a hologram of an unknown cell.

Meanwhile, the hologram for model generation and the hologram for identification may be acquired by different imaging devices 30. In addition, a plurality of holograms for model generation may be acquired and used in the generation of one learning model. In that case, images of the cells of a plurality of test subjects different from each other may be captured to form a plurality of holograms for model generation. In addition, the known cell and the unknown cell may be cells of test subjects different from each other.

The computer 1 and the imaging device 30 are connected to each other so that a hologram can be transmitted from the imaging device 30 to the computer 1. The imaging device 30 transmits the acquired image to the computer 1.

Subsequently, the functions of the learning model generation system 10 and the identification system 20 included in the computer 1 according to the present embodiment will be described. As shown in FIG. 1, the learning model generation system 10 is configured to include an acquisition unit for model generation 11, a generation unit for model generation 12, and a learning model generation unit 13.

The acquisition unit for model generation 11 is acquisition means for model generation configured to acquire a hologram for model generation in which an image of a cell is captured and which is used to generate a learning model. The acquisition unit for model generation 11 receives and acquires the hologram for model generation transmitted from the imaging device 30. In order to perform machine learning using more training data, the acquisition unit for model generation 11 may acquire a plurality of holograms for model generation for generating one learning model. Meanwhile, the acquisition of the hologram for model generation does not necessarily have to be performed by receiving what is transmitted from the imaging device 30, and may be performed by a user's input operation of the computer 1 or the like. The acquisition unit for model generation 11 outputs the acquired hologram for model generation to the generation unit for model generation 12.

In addition, the acquisition unit for model generation 11 acquires information indicating the type of cell photographed in the hologram for model generation, which corresponds to the hologram for model generation. The information is, for example, information indicating whether the cell is a cancer cell or a non-cancer cell, or information indicating the type of cancer cell to which the cell corresponds. The information is acquired, for example, in accordance with a user's input operation of the computer 1 or the like. The acquisition unit for model generation 11 outputs the acquired information indicating the type of cell to the learning model generation unit 13.

The generation unit for model generation 12 is generation means for model generation configured to generate a new hologram for model generation having a different focal position from the hologram for model generation acquired by the acquisition unit for model generation 11 and increase the number of holograms for model generation. The generation unit for model generation 12 may increase the number of holograms for model generation by adding or removing an aberration other than a change in a focal position to or from the hologram for model generation. The increase of the number of holograms for model generation performed by the generation unit for model generation 12 is data augmentation (DA) which is an increase of training data for performing machine learning. The generation unit for model generation 12 specifically increases the number of holograms for model generation as follows.

The generation unit for model generation 12 inputs the hologram for model generation from the acquisition unit for model generation 11. Since the hologram has phase information, it is possible to calculate (generate) another hologram having a focus at any depth position d by reverse propagation to d. This is called digital refocus (DR). The depth position d is a position in a direction perpendicular to the plane of the hologram for model generation with respect to the hologram for model generation.

The generation unit for model generation 12 generates a new hologram for model generation by performing DR on the hologram for model generation which is input from the acquisition unit for model generation 11. The depth position d related to DR is set in advance and is stored in the generation unit for model generation 12. The DR can be performed using a conventional method. For example, this can be performed using a method disclosed in Non-Patent Literature 2 or Wu, Y. et al, Optica, (2018) "Extended depth-of-field in holographic imaging using deep-learning-based autofocusing and phase recovery" (Non-Patent Literature 3).

The generation unit for model generation 12 may generate a plurality of new holograms for model generation by performing the DR on one hologram for model generation at a plurality of depth positions d different from each other. For example, the generation unit for model generation 12 performs the DR at a plurality of depth positions d on the front side of an original hologram for model generation and a plurality of depth positions d on the back side thereof to generate a new hologram for model generation for each of the depth positions d. N new holograms for model generation can be obtained by performing the DR for each of N depth positions $d_n$ (n=1 to N). For example, the DR is performed for each depth position $d_n$ in the range of ±10 μm at intervals of 1 μm. In this case, the relation of N=20 is established. Meanwhile, the focal position of a hologram for model generation to be generated does not need to be both the front side and the back side of the original hologram for model generation, and may be only one of them.

The above-described DR process is equivalent to a process of eliminating defocus of a hologram or a process of causing the hologram to be defocused. The defocus is one wave-front aberration, and a new hologram for model generation may be generated by adding or removing a wave-front aberration other than the defocus (such as piston, tilt, astigmatism, coma aberration, or spherical aberration) to or from the hologram for model generation.

The wave-front aberration usually deteriorates the quality of an image, and is generally preferred to be corrected (see, for example, D. Hillmann, H. Spahr, C. Hain, H. Sudkamp, G Franke, C. Pfaffle, C. Winter, and G Huttmann, "Aberration-free volumetric high-speed imaging of in vivo retina" Sci. Rep. 6, (2016) (Non-Patent Literature 4)). The generation unit for model generation 12 generates a new hologram for model generation, that is, increases data by intentionally adding wave-front aberration to the hologram for model generation using a conventional method of correcting wave-front aberration of a hologram. Meanwhile, the wave-front aberration added to the hologram is set in advance and is stored in the generation unit for model generation 12. Alternatively, the generation unit for model generation 12 may remove the wave-front aberration included in the hologram for model generation to generate a new hologram for model generation.

The following method can be used as a calculation method of adding wave-front aberration including defocus to a hologram. As represented by Expressions (4) and (5) of Non-Patent Literature 2, Fourier transformation is performed on an image-plane hologram once, and then wave-front aberration is added. Thereafter, inverse Fourier transformation is performed and the image-plane hologram is obtained. Alternatively, the wave-front aberration after Fourier transformation may be convolutionally integrated in the image-plane hologram.

The hologram for model generation to or from which the wave-front aberration other than the DR is added or removed may be a hologram for model generation after the DR. Alternatively, the wave-front aberration may be added or removed together with the DR to or from the hologram for model generation which is input from the acquisition unit for model generation 11. Meanwhile, the generation unit for model generation 12 may generate a new hologram for model generation by adding or removing an aberration other than the wave-front aberration to or from the hologram for model generation. In addition, the generation unit for model generation 12 may perform the DA other than the above (such as, for example, rotation, enlargement, or reduction of a hologram) on the hologram for model generation.

The generation unit for model generation 12 outputs the generated hologram for model generation to the learning model generation unit 13. The generation unit for model generation 12 may also output the original hologram for model generation which is input from the acquisition unit for model generation 11 to the learning model generation unit 13. That is, in addition to the generated hologram for model generation, the original hologram for model generation may also be used for machine learning. However, in a case where the DA can be achieved only by the generated hologram for model generation, the generation unit for model generation 12 may not output the original hologram for model generation to the learning model generation unit 13. That is, the original hologram for model generation does not necessarily need to be used for machine learning.

The learning model generation unit 13 is learning model generation means configured to generate a learning model by performing machine learning using the holograms for model generation increased by the generation unit for model generation 12. The learning model generation unit 13 may generate a learning model by performing machine learning using a plurality of holograms for model generation increased by the generation unit for model generation 12 collectively as one input.

The learning model which is generated by the learning model generation unit 13 is a model for inputting information based on a hologram in which an image of a cell that is a target for identification is captured and outputting information indicating the type of cell that is a target for identification. The learning model is configured to include, for example, a neural network. The neural network may be multi-layered. That is, the learning model generation unit 13 may generate a learning model by performing deep learning. In addition, the neural network may be a convolutional neural network (CNN).

The learning model is provided with neurons for inputting information based on a hologram in which an image of a cell that is a target for identification is captured in an input layer. For example, the information which is input to the learning model is the phase value of each pixel of a hologram. In this case, the input layer is provided with neurons having the number of pixels of the hologram, and the phase value of a corresponding pixel is input to each neuron. The information which is input to the learning model may include the amplitude value of each pixel in addition to the phase value of each pixel of the hologram. In this case, in addition to the above neurons, the input layer is provided with neurons for inputting the amplitude value of the number of pixels of the hologram. In this case, neurons having the number of pixels of the hologram×2 corresponding to phase and amplitude are provided. In a case where information in units of pixels is input to the learning model as described above, the hologram for model generation and the hologram for identification become holograms having a size which is set in advance.

In addition to or instead of the above, either or both of the real part and imaginary part of the complex amplitude of the hologram may be used as input to the learning model. In addition, the input to the learning model may be information other than the above insofar as it is based on a hologram in which an image of a cell that is a target for identification is captured. In addition, the input to the learning model may include information other than the information based on the hologram in which an image of a cell that is a target for identification is captured.

The learning model is provided with neurons for outputting information indicating the type of cell that is a target for identification in an output layer. For example, neurons for each type to be identified, that is, neurons having the number of types, are provided, and it is shown that as a numerical value which is output from the neuron becomes larger, a degree to which a cell that is a target for identification is a type corresponding to the neuron increases. Meanwhile, the output from the learning model may be information other than the above insofar as it is information indicating the type of cell that is a target for identification.

Meanwhile, the learning model which is generated by the learning model generation unit 13 may be constituted by anything other than the neural network.

The learning model generation unit 13 inputs the hologram for model generation from the generation unit for model generation 12. The hologram for model generation to be input is a plurality of holograms for model generation obtained by performing the DA on one original hologram for model generation. Usually, there are a plurality of original holograms for model generation, and the corresponding holograms for model generation are input. The learning model generation unit 13 inputs information indicating the type of cell corresponding to the hologram for model generation from the acquisition unit for model generation 11. A plurality of holograms for model generation on which the DA is performed all correspond to the types of cells corresponding to the original hologram for model generations.

The learning model generation unit 13 generates a learning model by performing machine learning using information based on the input hologram for model generation as a value of input to the learning model and information based on information indicating the type of corresponding cell as an output value of the learning model. For the output value of the learning model in this case, for example, the value of a neuron corresponding to the type of corresponding cell is set to 1, and the values of neurons corresponding to the other types are set to 0. By setting the output value in this way, it is shown that, as described above, as a numerical value which is output from the neuron of the output layer becomes larger, a degree to which a cell that is a target for identification is a type corresponding to the neuron increases.

The machine learning performed by the learning model generation unit 13 is performed similarly to machine learning for generating a conventional learning model. For example, the machine learning is performed by optimizing parameters such as the weighting coefficient of the CNN so that the information based on the information indicating the type of corresponding cell becomes the output value when the information based on the hologram for model generation is used as the input value. The learning model generation unit 13 outputs information indicating the generated learning model (for example, information indicating the structure of the CNN and optimized parameters) to the identification system 20.

In the above-described learning model, information is input in units of holograms, but in the learning model, information based on a plurality of holograms may be input at one time. For example, the learning model may be a model in which information based on a plurality of holograms obtained by the DA from one original hologram is input at one time. Meanwhile, the plurality of holograms for model generation may also include the original hologram for model generation. For example, the learning model may input information based on a pseudo-three-dimensional image in which a plurality of holograms focused on different depth positions d are grouped (for example, stacked). In this case, the number of holograms relates to the information which are input to the learning model is set in advance. The information which is input for each hologram may be similar to that described above, and in that case, as many neurons as the number of holograms for model generation are provided in the input layer.

Alternatively, in a case where the plane of the original hologram is defined as a plane on XY coordinates (fault plane) and a depthwise direction is defined as a Z coordinate, information based on the XZ plane (coronal section) and the YZ plane (sagittal section) of the pseudo-three-dimensional image may be input to the learning model. In these cases, it is also possible to generate a learning model through the same machine learning as the above-described method. The above is the function of the learning model generation system 10.

Subsequently, the function of the identification system 20 according to the present embodiment will be described. As shown in FIG. 1, the identification system 20 is configured to include an acquisition unit for identification 21, a generation unit for identification 22, and an identification unit 23.

The acquisition unit for identification 21 is acquisition means for identification configured to acquire a hologram for identification in which an image of a cell that is a target for identification is captured. The acquisition unit for identification 21 receives and acquires the hologram for identification transmitted from the imaging device 30. Meanwhile, the acquisition of the hologram for identification does not necessarily have to be performed by receiving what is transmitted from the imaging device 30, and may be performed by a user's input operation of the computer 1 or the like. The acquisition unit for identification 21 outputs the acquired hologram for identification to the generation unit for identification 22.

The generation unit for identification 22 is generation means for identification configured to generate a new hologram for identification having a different focal position from the hologram for identification acquired by the acquisition unit for identification 21 and increasing the number of holograms for identification. The generation unit for identification 22 may increase the number of holograms for identification by adding or removing an aberration other than a change in a focal position to or from the hologram for identification.

The generation unit for identification 22 inputs the hologram for identification from the acquisition unit for identification 21. The generation unit for identification 22 increases the number of input holograms for identification similarly to the increase of the number of holograms for model generation performed by the generation unit for model generation 12. However, the increase performed by the generation unit for identification 22 does not necessarily have to be performed in exactly the same manner as the increase performed by the generation unit for model generation 12 insofar as the identification in the identification system 20 is possible (that is, insofar as input to the learning model in the identification system 20 can be performed).

For example, the depth position d related to a newly generated hologram for identification does not necessarily have to be the same as the depth position d related to a newly generated hologram for model generation. Alternatively, a wave-front aberration other than defocus which is added to or removed from the hologram for model generation may not be added to or removed from the hologram for identification. Alternatively, a wave-front aberration other than defocus which is not added to or removed from the hologram for model generation may be added to or removed from the hologram for identification.

The generation unit for identification 22 outputs the generated hologram for identification to the identification unit 23. The generation unit for identification 22 may also output the original hologram for identification which is input from the acquisition unit for identification 21 to the identification unit 23. That is, in addition to the generated hologram for identification, the original hologram for identification may also be used for identification. However, in a case where the DA can be achieved only by the generated hologram for identification, the generation unit for identification 22 may not output the original hologram for identification to the identification unit 23. That is, the original hologram for identification does not necessarily need to be used for identification.

The identification unit 23 is identification means configured to identify a cell that is a target for identification on the basis of the hologram for identification increased by the generation unit for identification 22. The identification unit 23 may identify a cell that is a target for identification using the learning model generated by the learning model generation system 10. The identification unit 23 may identify the cell that is a target for identification for each increased hologram for identification, and finally identify the cell that is a target for identification on the basis of an identification result for each hologram for identification. The identification unit 23 may identify a cell that is a target for identification using a plurality of holograms for identification increased by the generation unit for identification 22 collectively as one input.

The identification unit 23 inputs and stores information indicating the learning model from the learning model generation system 10, and uses it for identifying a cell that is a target for identification. The identification unit 23 inputs the hologram for identification from the generation unit for identification 22. The hologram for identification to be input is a plurality of holograms for identification obtained by performing the DA on one original hologram for identification. The identification unit 23 identifies the type of cell that is a target for identification for each original hologram for identification (hologram for identification acquired by the acquisition unit for identification 21).

In a case where the learning model inputs information based on one hologram, the identification unit 23 performs identification as follows. The identification unit 23 obtains an output value from the learning model using information based on a hologram as the value of input to the learning model for each of a plurality of input holograms for identification. The output value is a numerical value indicating a degree to which a cell that is a target for identification is the type for each type of cell. The identification unit 23 sets a type having the largest numerical value for each hologram for identification as the type of cell that is a target for identification. The identification unit 23 performs identification for each hologram for identification on all of a plurality of holograms for identification, and sets the most identified type as a final identification result of the type of cell that is a target for identification. That is, the identification unit 23 uses the DR to make a majority decision of a plurality of identifications. Making a majority decision of a plurality of predictions to improve the degree of accuracy is referred to as "ensemble" in terms of machine learning, and thus this is referred to as a DR ensemble.

In a case where the learning model uses information based on a plurality of holograms as one input, the identification unit 23 performs identification as follows. The identification unit 23 obtains an output value from the learning model using information based on a collection of a plurality of input holograms for identification (for example, information based on the above-described pseudo-three-dimensional image or information based on the XY plane (fault plane), XZ plane (coronal section), and YZ plane (sagittal section) of a three-dimensional image) as the value of input to the learning model. The identification unit 23 identifies the type of cell that is a target for identification on the basis of the output value from the learning model.

Meanwhile, the identification performed by the identification unit 23 does not necessarily have to be performed as described above insofar as it is performed on the basis of the increased hologram for identification. For example, the identification unit 23 may perform identification without using a learning model.

The identification unit 23 outputs the identification result. For example, the identification unit 23 causes a display device included in the computer 1 to display information indicating the identification result. The display is referred to by, for example, a user of the computer 1. Meanwhile, the output performed by the identification unit 23 may be performed in an aspect other than the above. For example, the information indicating the identification result may be transmitted and output from the computer 1 to another device. The above is the function of the identification system 20.

Figure 3:
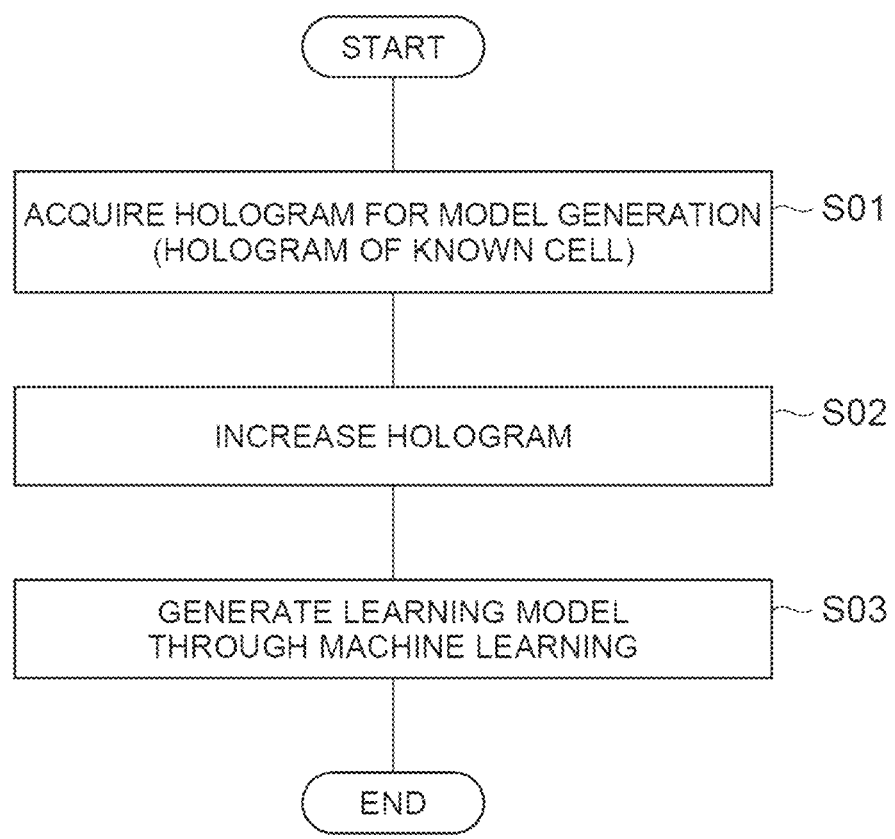
FIG. 3 is a flowchart illustrating a learning model generation method which is a process executed by the learning model generation system according to the embodiment of the present invention.
Figure 4:
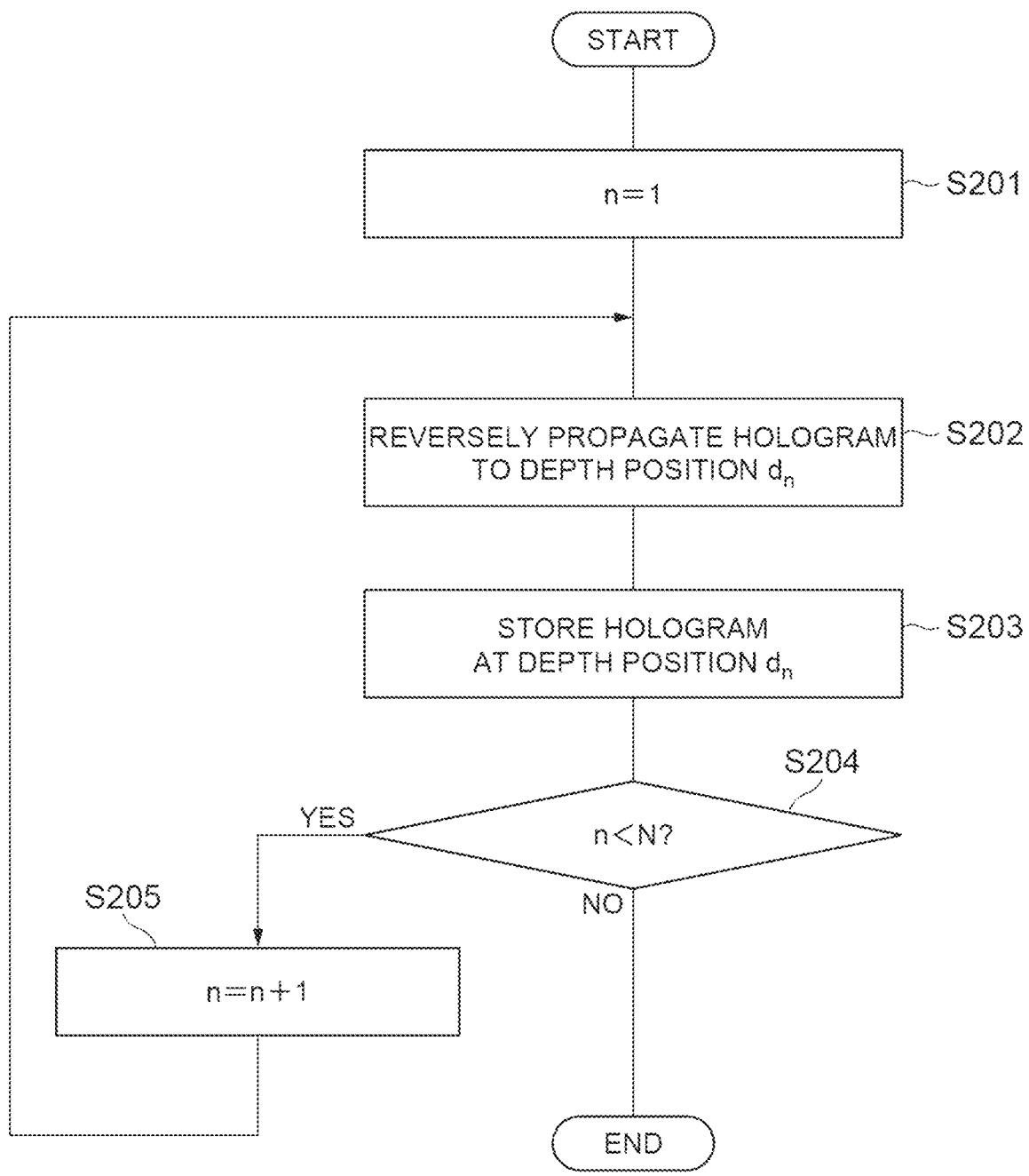
FIG. 4 is a flowchart illustrating a process of increasing a hologram.
Figure 5:
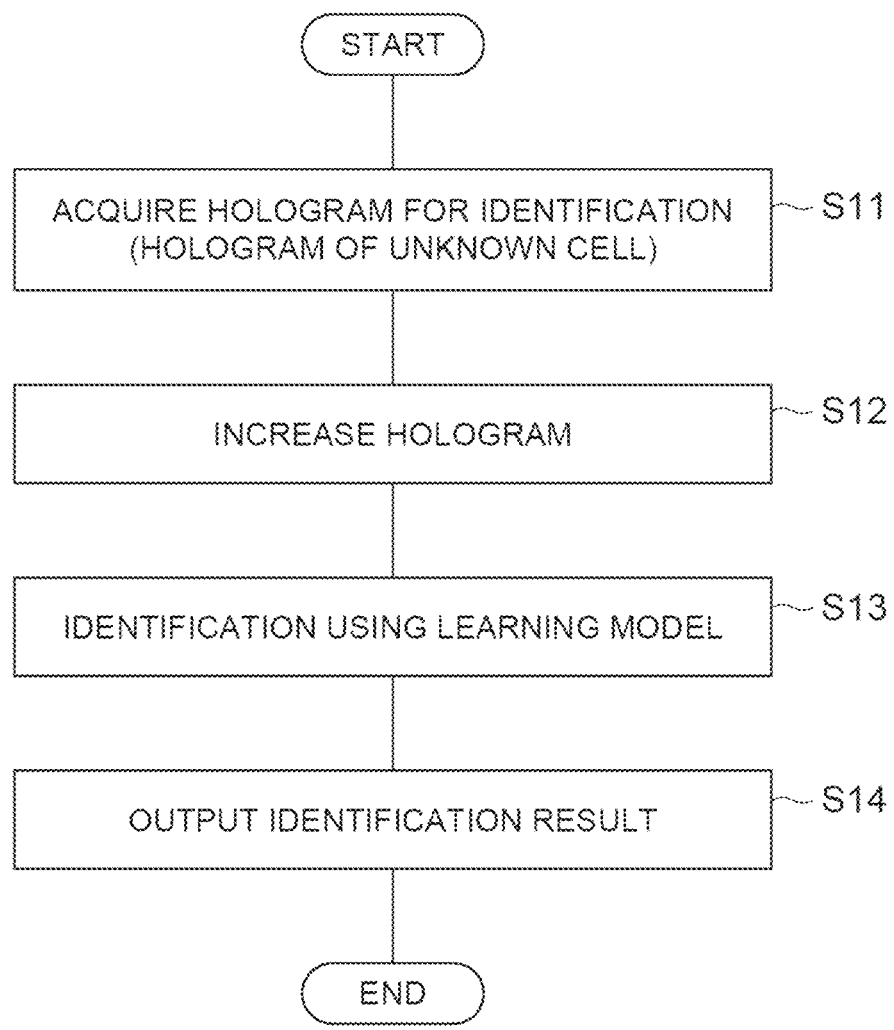
FIG. 5 is a flowchart illustrating an identification method which is a process executed by the identification system according to the embodiment of the present invention.

Subsequently, processing executed by the computer 1 (an operation method performed by the computer 1) according to the present embodiment will be described with reference to the flowcharts of FIGS. 3 to 5. First, a learning model generation method which is a process executed when the learning model is generated, that is, a process executed by the learning model generation system 10 according to the present embodiment, will be described with reference to the flowcharts of FIGS. 3 and 4. In this process, first, the acquisition unit for model generation 11 acquires a hologram for model generation which is a hologram of a known cell (S01, an acquisition step for model generation). In addition, along with the acquisition of the hologram for model generation, the acquisition unit for model generation 11 acquires information indicating the type of known cell photographed in the hologram for model generation. Subsequently, the generation unit for model generation 12 generates a new hologram for model generation having a different focal position from the hologram for model generation. That is, the hologram for model generation is increased (S02, a generation step for model generation).

An example of a process of increasing the hologram for model generation will be described with reference to the flowchart of FIG. 4. In this example, N holograms for model generation are newly generated. First, an index n of the depth position (focal position) of the hologram is set to 1 (S201). Subsequently, the original hologram for model generation is reversely propagated to the depth position $d_n$, and a new hologram for model generation corresponding to the depth position $d_n$ is generated (S202). The generated new hologram for model generation is stored in the computer 1 and is used for the subsequent processes (S203). Subsequently, it is determined whether the relation of n<N is established (S204). In the case of n<N, the relation of n=n+1 is established (S205), and the processes of S202 to S204 are performed again. In a case where n<N is not established, N new holograms for model generation are generated and stored, and the process of increasing the hologram for model generation is ended.

Referring back to FIG. 3, subsequently, the learning model generation unit 13 performs machine learning using the increased hologram for model generation to generate a learning model (S03, a learning model generation step). The generated learning model is output from the learning model generation unit 13 to the identification system 20, stored by the identification unit 23, and used for identification. The above is the processing executed by the learning model generation system 10 according to the present embodiment.

Subsequently, an identification method which is a process executed when the type of cell is identified using a hologram, that is, a process executed by the identification system 20 according to the present embodiment, will be described with reference to the flowchart of FIG. 5. In this process, first, the acquisition unit for identification 21 acquires a hologram for identification which is a hologram of an unknown cell (S11, an acquisition step for identification). Subsequently, the generation unit for identification 22 generates a new hologram for identification having a different focal position from the hologram for identification. That is, the hologram for identification is increased (S12, a generation step for identification). The increase of the hologram for identification is performed similarly to the increase of the hologram for model generation described with reference to the flowchart of FIG. 4.

Subsequently, the identification unit 23 uses the increased hologram for model generation and the learning model generated by the learning model generation system 10 to identify the type of unknown cell photographed in the hologram for identification (S13, an identification step). Subsequently, the identification unit 23 outputs information indicating the identification result (S14). The above is the processing executed by the identification system 20 according to the present embodiment.

As described above, in the present embodiment, a new hologram for model generation is generated from the original hologram for model generation, that is, the hologram for model generation is increased, to generate a learning model. In addition, in the present embodiment, a new hologram for identification is generated from the original hologram for identification, that is, the hologram for identification is increased, to identify a cell that is a target for identification. In the present embodiment, since the hologram is increased by changing its focal position, it is possible to train the learning model so that cells can be accurately identified regardless of the direction of flow of the cells having a three-dimensional shape during image capturing, or to perform accurate identification. In addition, since contents included in an image (such as the number of nucleoli) are changed by changing the focus, it is considered that the effect of increasing the hologram is large. In this manner, according to the present embodiment, it is possible to generate an appropriate learning model even in a case where many images cannot be prepared in advance, and to appropriately identify cells as a result.

In addition, as in the present embodiment, the number of holograms for model generation may be increased by adding or removing an aberration other than a change in a focal position to or from the hologram during the increase of the hologram. According to such a configuration, it is possible to raise the increase rate of the hologram. Alternatively, it is possible to appropriately increase the hologram. As a result, it is possible to identify cells more appropriately. However, an aberration other than a change in a focal position during the increase of the hologram does not necessarily have to be added or removed.

In addition, as in the present embodiment, generation of a learning model and identification may be performed using a plurality of increased holograms collectively as one input. For example, generation of a learning model and identification may be performed using a plurality of increased holograms as pseudo-three-dimensional images as described above. According to such a configuration, for example, it is possible to identify cells more appropriately for the type of cell having a characteristic three-dimensional shape. However, such as configuration does not necessarily have to be adopted, and information for each hologram may be input to the learning model in generation of a learning model and identification.

In addition, as in the present embodiment, the DR ensemble may be performed during the identification of the type of cell. According to such a configuration, it is possible to improve the accuracy of identification. However, the DR ensemble does not necessarily have to be performed.

Meanwhile, in the present embodiment, the computer 1 includes the learning model generation system 10 and the identification system 20, but the learning model generation system 10 and the identification system 20 may be implemented independently of each other. In this case, the learning model generated by the learning model generation system 10 does not necessarily have to be used for identification using the increased hologram. In addition, the learning model used in the identification system 20 does not necessarily have to undergo machine learning on the basis of the increased hologram.

In addition, the learning model generated by the learning model generation system 10 is assumed to be used as a program module which is a portion of artificial intelligence software. The learning model is used in a computer including a CPU and a memory. Specifically, the CPU of the computer operates so as to input information to the input layer of a neural network in accordance with a command from the learning model stored in the memory, perform calculation based on a learned weighting coefficient or the like in the neural network, and output the result from the output layer of the neural network.

In order to confirm the effectiveness of the present embodiment, the following evaluation was performed. Evaluation was performed by 10-fold cross validation using 1,000 holograms of each of the five types of established cancer cell lines acquired by a quantitative phase microscope (5,000 in total). The 10-fold cross validation is a method of obtaining test results for all data by dividing data of 5,000 cases into ten subsets of 500 cases each and repeating a process of using one of the subsets as test data and the rest as training data while changing the subset used as test data. The accuracy calculated by the following expression was used as an evaluation index.

Accuracy=number of correct identification results/ total number of data×100%

In the increase of the hologram based on the DR, 21 holograms with a depth position in the range of ±10 μm were created at intervals of 1 μm, and the number of holograms for model generation (the number of training data) was increased 21 times to 94,500 cases.

Figure 6:
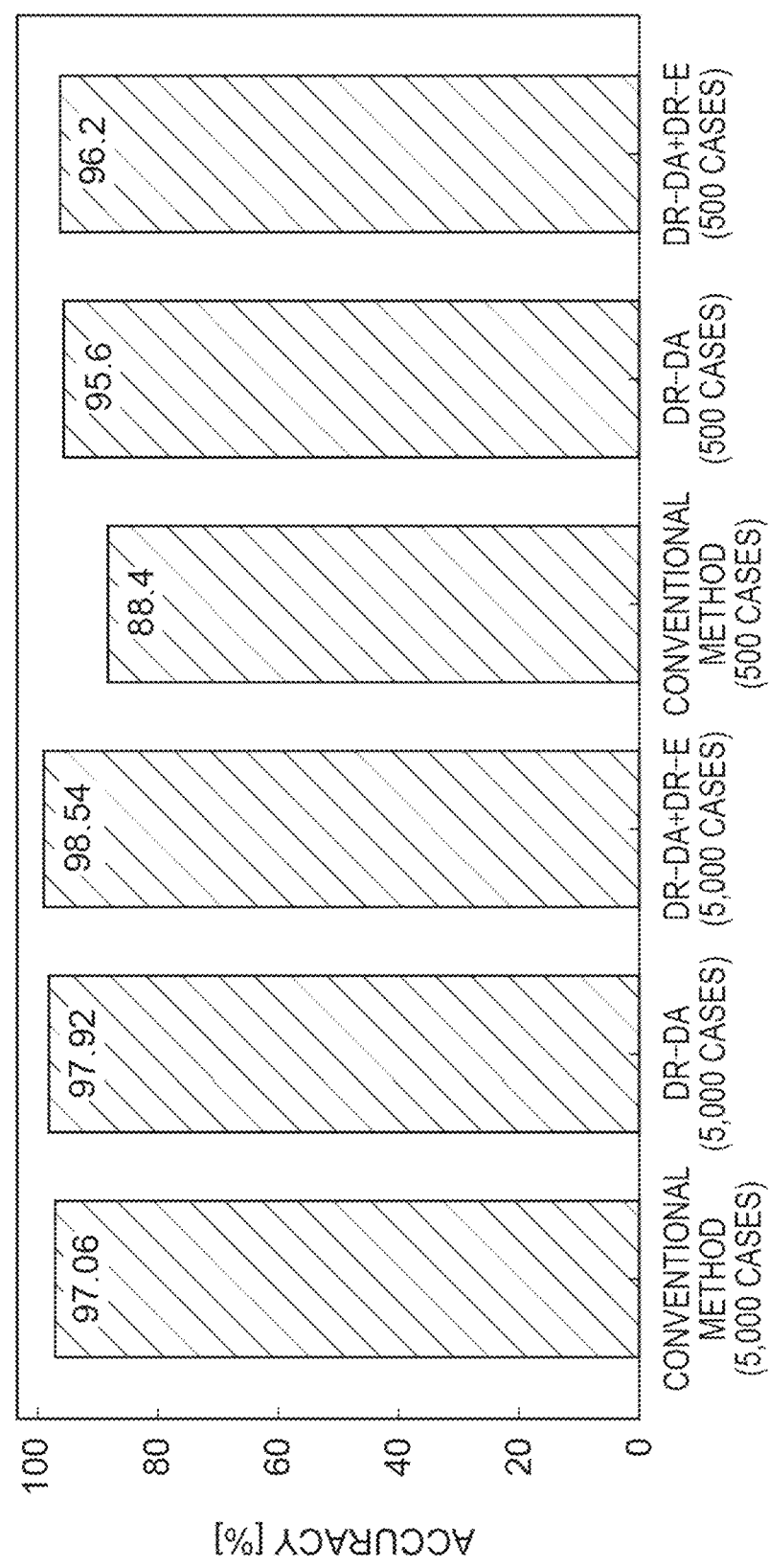
FIG. 6 is a graph illustrating evaluation results of identification according to the embodiment of the present invention.

FIG. 6 shows evaluation results. DR-DA means that the hologram for model generation based on the DR according to the present embodiment is increased (not increased during identification), and DR-DA+DR-E means that the hologram for model generation based on the DR according to the present embodiment is increased and means that there is a DR ensemble during identification. In a case where the number of data is 5,000, the accuracies of the conventional method (no increase during both machine learning and identification), DR-DA, and DR-DA+DR-E were 97.06%, 97.92%, and 98.54%. In a case where the number of data was reduced to ⅒, the accuracies of the conventional method, DR-DA, and DR-DA+DR-E were 88.4%, 95.6%, and 96.2%.

When the number of data was reduced to ⅒, the accuracy of the conventional method was decreased by nearly 10%. On the other hand, a decrease in the accuracy of DR-DA according to the present embodiment was suppressed to approximately 1.5%. These results have suggested that even if the number of data is reduced and the measurement time is reduced to ⅒, the hologram is increased by the DR and identification is performed with a small decrease in accuracy.

Figure 7:
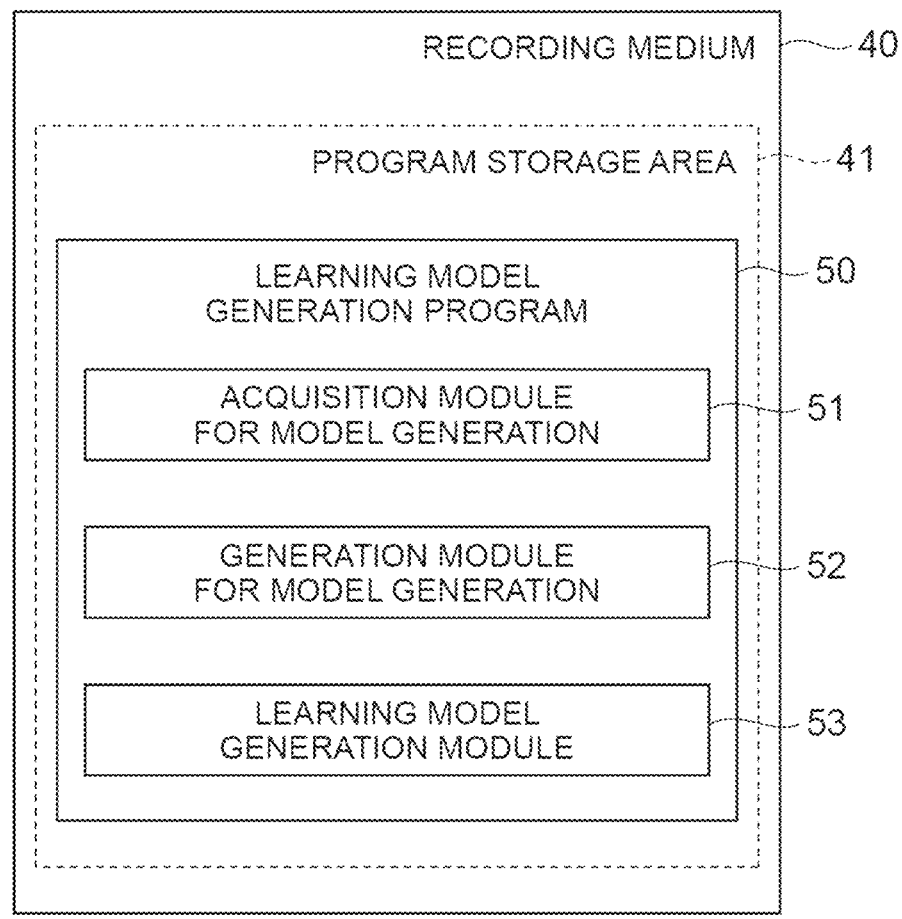
FIG. 7 is a diagram illustrating a configuration of a learning model generation program according to the embodiment of the present invention together with a recording medium.

Subsequently, a learning model generation program and an identification program for executing a series of processes described above which are performed by the learning model generation system 10 and the identification system 20 will be described. As shown in FIG. 7, a learning model generation program 50 is stored in a program storage area 41 formed in a computer readable recording medium 40 which is inserted into and accessed by a computer or is provided in the computer. The recording medium 40 may be a non-transitory recording medium.

The learning model generation program 50 is configured to include an acquisition module for model generation 51, a generation module for model generation 52, and a learning model generation module 53. Functions realized by executing the acquisition module for model generation 51, the generation module for model generation 52, and the learning model generation module 53 are the same as the functions of the acquisition unit for model generation 11, the generation unit for model generation 12, and the learning model generation unit 13 of the learning model generation system 10 described above.

Figure 8:
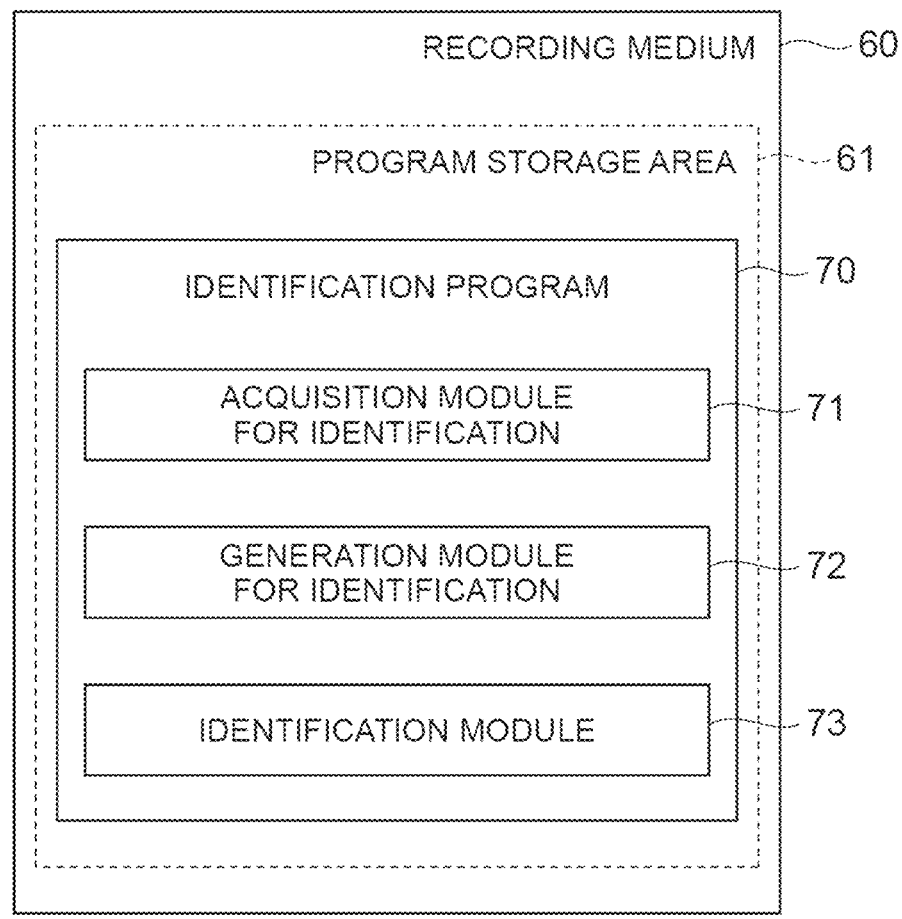
FIG. 8 is a diagram illustrating a configuration of an identification program according to the embodiment of the present invention together with a recording medium.

As shown in FIG. 8, an identification program 70 is stored in a program storage area 61 formed in a computer readable recording medium 60 which is inserted into and accessed by a computer or is provided in the computer. The recording medium 60 may be a non-transitory recording medium. Meanwhile, the recording medium 60 may be the same as the recording medium 40.

The identification program 70 is configured to include an acquisition module for identification 71, a generation module for identification 72, and an identification module 73. Functions realized by executing the acquisition module for identification 71, the generation module for identification 72, and the identification module 73 are the same as the functions of the acquisition unit for identification 21, the generation unit for identification 22, and the identification unit 23 of the identification system 20 described above.

Meanwhile, some or all of the learning model generation program 50 and the identification program 70 may be configured to be transmitted through a transmission medium such as a communication line and received and recorded (inclusive of installed) by another instrument. In addition, each module of the learning model generation program 50 and the identification program 70 may be installed on any of a plurality of computers rather than one computer. In that case, a series of processes described above are performed by a computer system based on the plurality of computers.

What is claimed is:

1. A learning model generation method of generating a learning model for identifying a cell on the basis of a captured image of the cell, the method comprising:

acquiring a hologram for model generation in which an image of the cell is captured, the hologram for model generation being used to generate the learning model;

generating a new hologram for model generation having a different focal position from the acquired hologram for model generation and increasing a number of holograms for model generation; and generating the learning model by performing machine learning using at least the acquired hologram and the new hologram as inputs for model generation, wherein the learning model is operative to output a type of cell or cell classification.

2. The learning model generation method according to claim 1, wherein the method includes increasing the number of holograms for model generation by adding or removing an aberration other than a change in a focal position to or from the hologram for model generation.

3. The learning model generation method according to claim 1, wherein the method includes generating the learning model by performing machine learning using a plurality of increased holograms for model generation collectively as one input.

4. The learning model generation method according to claim 1, wherein the type of cell or cell classification includes whether the cell is a cancer cell or a non-cancer cell.

5. The learning model generation method according to claim 4, wherein the type of cell or cell classification further includes a cancer type corresponding to the cancer cell.

6. An identification method of identifying a cell that is a target for identification on the basis of a captured image of the cell, the method comprising:

acquiring a hologram for identification in which an image of the cell that is a target for identification is captured;

generating a new hologram for identification having a different focal position from the acquired hologram for identification and increasing a number of holograms for identification; and identifying a type of cell or cell classification for the cell using a learning model on the basis of at least the acquired hologram and the new hologram.

7. The identification method according to claim 6, wherein the method includes increasing the number of holograms for identification by adding or removing an aberration other than a change in a focal position to or from the hologram for identification.

8. The identification method according to claim 6, wherein the method includes identifying a type of cell or cell classification for the cell using the learning model generated by performing machine learning using at least the acquired hologram and the new hologram as inputs for model generation, wherein the learning model is operative to output the type of cell or cell classification.

9. The identification method according to claim 6, wherein the method includes identifying a type of cell or cell classification for the cell for each increased hologram that is used as an input for identification, and finally identifying the type of cell or cell classification for the cell on the basis of an identification result for each hologram for identification.

10. The identification method according to claim 6, wherein the method includes identifying a type of cell or cell classification for the cell using a plurality of increased holograms for identification collectively as one input.

11. The identification method according to claim 6, wherein the type of cell or cell classification includes whether the cell is a cancer cell or a non-cancer cell.

12. The identification method according to claim 11, wherein the type of cell or cell classification further includes a cancer type corresponding to the cancer cell.

13. A learning model generation system configured to generate a learning model for identifying a cell on the basis of a captured image of the cell, the system comprising circuitry configured to:

acquire a hologram for model generation in which an image of the cell is captured, the hologram for model generation being used to generate the learning model;

generate a new hologram for model generation having a different focal position from the acquired hologram for model generation and increase a number of holograms for model generation; and generate the learning model by performing machine learning using at least the acquired hologram and the new hologram as inputs for model generation, wherein the learning model is operative to output a type of cell or cell classification.

14. The learning model generation system according to claim 13, wherein the type of cell or cell classification includes whether the cell is a cancer cell or a non-cancer cell.

15. The learning model generation system according to claim 14, wherein the type of cell or cell classification further includes a cancer type corresponding to the cancer cell.

16. An identification system configured to identify a cell that is a target for identification on the basis of a captured image of the cell, the system comprising circuitry configured to:

acquire a hologram for identification in which an image of the cell that is a target for identification is captured;

generate a new hologram for identification having a different focal position from the acquired hologram for identification and increase a number of holograms for identification; and identify a type of cell or cell classification for the cell using a learning model on the basis of at least the acquired hologram and the new hologram.

17. The identification system according to claim 16, wherein the type of cell or cell classification includes whether the cell is a cancer cell or a non-cancer cell.

18. The identification system according to claim 17, wherein the type of cell or cell classification further includes a cancer type corresponding to the cancer cell.

19. A non-transitory computer-readable storage medium storing a learning model generation program causing a computer to operate as a learning model generation system configured to generate a learning model for identifying a cell on the basis of a captured image of the cell, the program causing the computer to:

acquire a hologram for model generation in which an image of the cell is captured, the hologram for model generation being used to generate the learning model;

generate a new hologram for model generation having a different focal position from the acquired hologram for model generation and increase a number of holograms for model generation; and generate the learning model by performing machine learning using at least the acquired hologram and the new hologram as inputs for model generation, wherein the learning model is operative to output a type of cell or cell classification.

20. A non-transitory computer-readable storage medium storing an identification program causing a computer to operate as identification system configured to identify a cell that is a target for identification on the basis of a captured image of the cell, the program causing the computer to:
  acquire a hologram for identification in which an image of the cell that is a target for identification is captured;
  generate a new hologram for identification having a different focal position from the acquired hologram for identification and increase a number of holograms for identification; and
  identify a type of cell or cell classification for the cell using a learning model on the basis of at least the acquired hologram and the new hologram.

* * * * *